United States Patent [19]
Nitadori

[11] Patent Number: 5,875,183
[45] Date of Patent: Feb. 23, 1999

[54] MOBILE COMMUNICATION SYSTEM

[75] Inventor: Kazuhiko Nitadori, Tokyo, Japan

[73] Assignee: OKI Electric Industry Co., Ltd., Tokyo, Japan

[21] Appl. No.: 772,872

[22] Filed: Dec. 26, 1996

[30] Foreign Application Priority Data

Jan. 10, 1996 [JP] Japan ..................................... 8-001896

[51] Int. Cl.⁶ .................................................. H04Q 7/00
[52] U.S. Cl. .......................... 370/328; 370/350; 455/456
[58] Field of Search .................................. 370/328, 329, 370/334, 336, 346, 347, 349, 350; 455/440, 456, 461, 462; 342/357, 457, 450, 458

[56] References Cited

PUBLICATIONS

"STEPS FORWARD", Proceedings of the Second World Congress on Intelligent Transport Systems, '95 Yokohama vol. 111, Edited by VERTIS, pp. 188–197 and pp. 199–211, 1995.
INTERCONNECTIONS, by Radia Perlman, Japanese language edition, SOFTBANK., pp. 210–223, 1995.

*Primary Examiner*—Ajit Patel
*Attorney, Agent, or Firm*—Venable; Robert J. Frank; Allen Wood

[57] ABSTRACT

A mobile communication system is provided which serves as an information infrastructure capable of providing intelligent information transmission and services. A mobile station on each vehicle traveling on a road includes first and second transceivers for carrying out radio communications with a third transceiver of a base station installed on a roadside. The first transceiver of a first mobile station is linked not only with the third transceiver of the base station through a first communication channel, but is also linked with the second transceiver of a second mobile station via a second communication channel. The first mobile station carries out information communications with the base station using the first communication channel, and at the same time with the second mobile station via the second communication channel. The first, second and third transceivers each have the function of measuring the incoming direction of the radio wave from the party, and calculating the distance to the party so that the location of each mobile station is identified in each station.

10 Claims, 12 Drawing Sheets

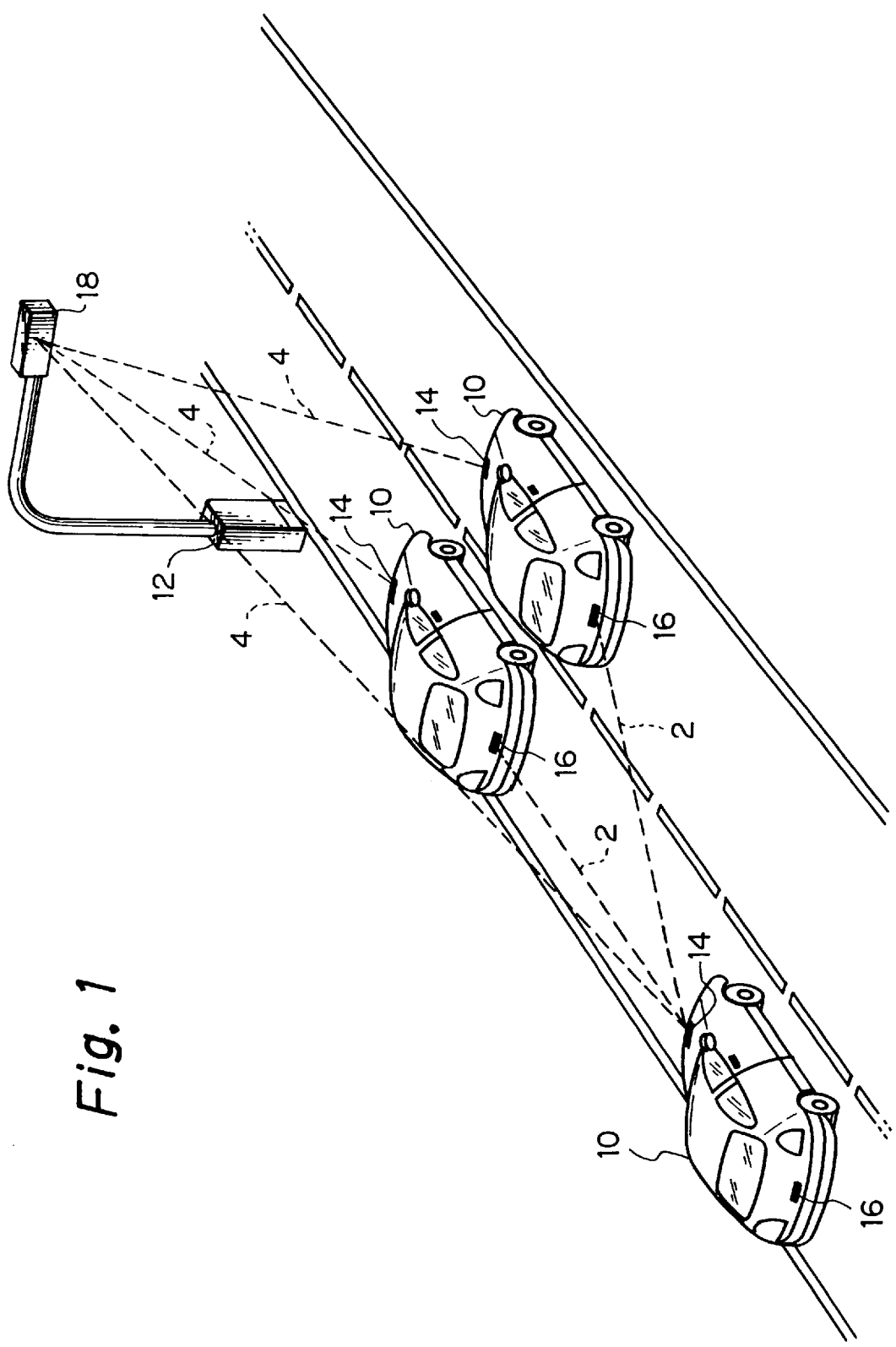

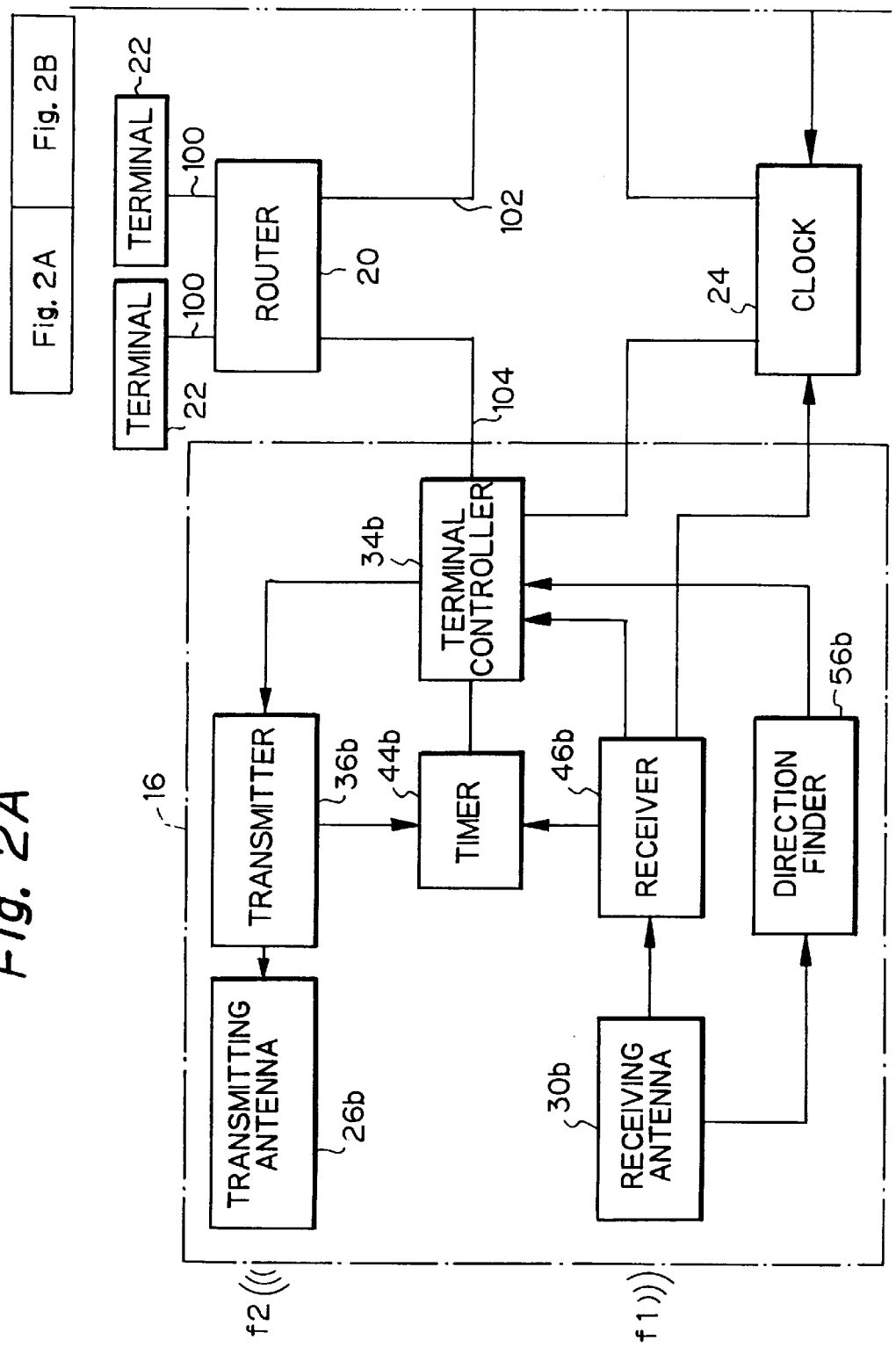

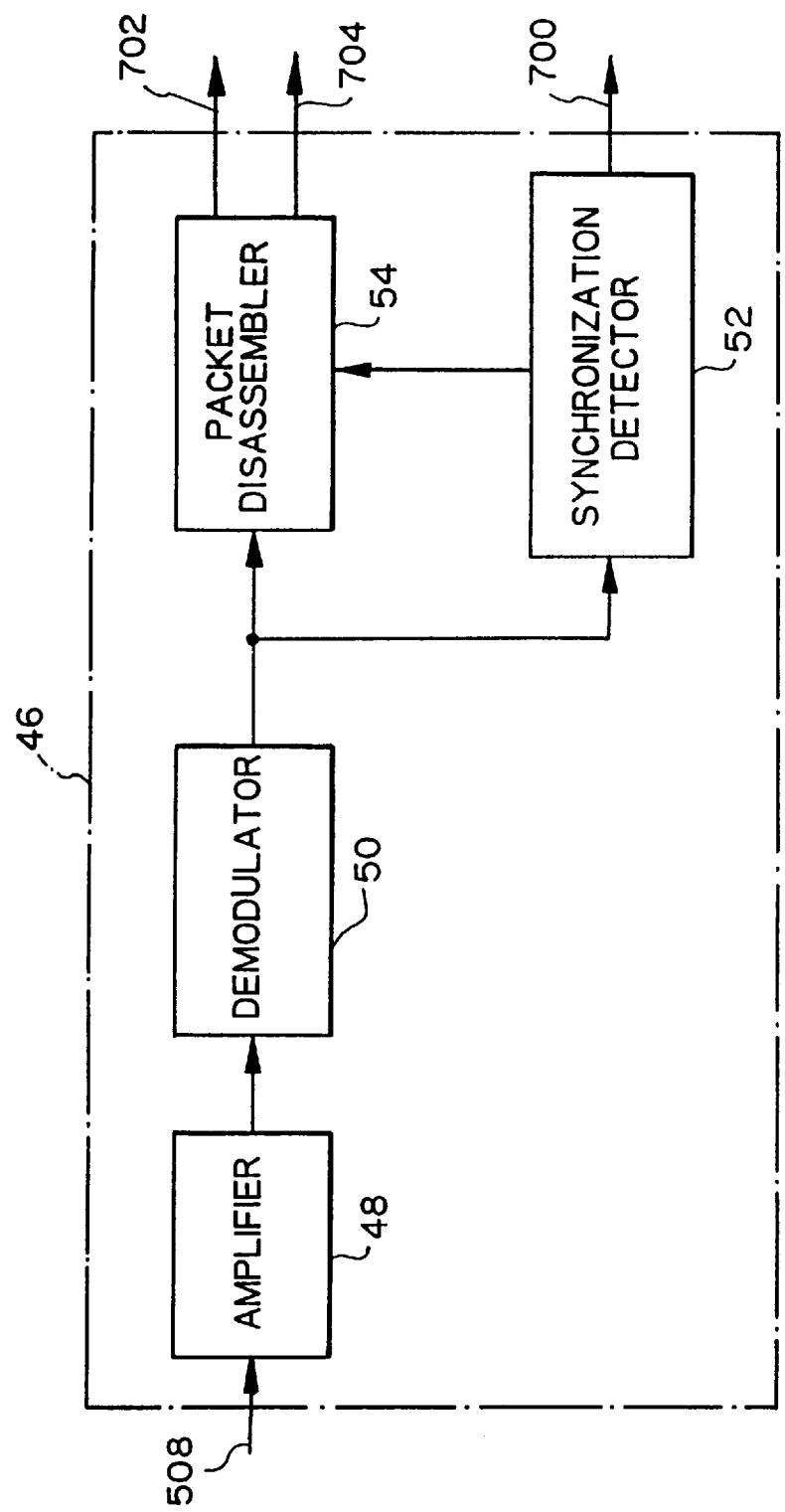

| Fig. 8A | Fig. 8B |

Fig. 9A — 900: PRE & SYNC | TYP | SA | EDC

Fig. 9B — 902: PRE & SYNC | TYP | SA | DA | OFF | EDC

Fig. 9C — 904: PRE & SYNC | TYP | SA | DA | EDC

Fig. 9D — 906: PRE & SYNC | TYP | SA | DA | EDC

Fig. 9E — 908: PRE & SYNC | TYP | SA | DA | MN | DATA | TC | EDC

Fig. 9F — 910: PRE & SYNC | TYP | SA | DA | MN | OFF | EDC

Fig. 10A — 1000: DVA | DPA | SVA | SPA | HD | DATA

Fig. 10B — 1002: DP | SA | HD | DATA

Fig. 10C — 1004: ROAD NUMBER | GROUP NUMBER | VEHICLE NUMBER | TERMINAL NUMBER

Fig. 10D — 1006: ROAD NUMBER | GROUP NUMBER | VEHICLE NUMBER | TERMINAL NUMBER

Fig. 10E — 1008: RELATIVE POSITION | DISTANCE | DIRECTION

MOBILE COMMUNICATION SYSTEM

BACKGROUND OF THE INVENTION

1. Field of the Invention

The present invention relates to a mobile communication system which carries out information transmission between vehicles traveling on a road, or between vehicles and a roadside communication network, and particularly to a mobile communication system capable of offering sophisticated services applicable in common to expressways or the like in future.

2. Description of the Background Art

The Road/Automobile Communication System, which is administered by the Public Works Research Institute of the Ministry of Construction of Japan, is known as one of the conventional mobile communication systems which provide channels between vehicles and a roadside communication network. Such a system is provided with a plurality of on-road stations installed at intervals for projecting spotlight-like beacons onto a road like a street or expressway, to carry out intermittent communications between the mobile station of a vehicle and the roadside communication network when the vehicle passes through a small zone (radio zone) intermittently formed on the road.

Thus, the vehicle obtains its own position information by the intermittent communications which are carried out at the radio zone interval between the mobile station and the on-road station that forms the spotlight-like radio zone and that receives radio waves from the mobile station. Accordingly, the position information obtained by the conventional system is rather inaccurate. As a result, the conventional system cannot offer intelligent information about driving if precise position information about vehicles is required. For example, it is impossible to carry out automatic driving in which the vehicles drive themselves automatically in response to their position information, or platooning driving in which a plurality of vehicles drive themselves in a group, because of the lack of precise position information for controlling the driving.

As another communication system, a method is proposed which provides an uninterrupted message channel between an automobile and a leakage coaxial cable laid along a roadside. Even in this case, a problem still remains in that the position information of the automobile cannot be obtained.

SUMMARY OF THE INVENTION

It is therefore an object of the present invention to eliminate the problems of the conventional techniques to provide a mobile communication system as an information infrastructure for intelligent transport systems, which mobile communication system can measure positions of mobile stations, and thus can implement sophisticated information and communication services.

According to one aspect of the present invention, there is provided a mobile communication system for providing radio communication channels for transmitting information between a mobile station mounted on a vehicle traveling on a road and a fixed communication network installed on a roadside, wherein the fixed communication network includes a base station comprising a first transmitting and receiving device for carrying out radio communications with the mobile station by transmitting and receiving a data packet, wherein the mobile station comprises a second transmitting and receiving device for carrying out radio communications with the first transmitting and receiving device by transmitting and receiving a data packet, wherein each of the first and second transmitting and receiving devices comprises: a transceiver for carrying out radio communications with its party; two or more receiving antennas separated apart by a predetermined distance; a direction finder for determining, in response to a radio signal caught by each of the receiving antennas, an incident angle of the radio signal on the receiving antenna; and a controller for controlling transmitting and receiving of a data packet to and from the party, and wherein the controller measures a distance between the first and second transmitting and receiving devices and a direction with respect to the party in response to a transmitting time of the data packet and a received time of the radio signal from the party, and to the incident angle detected by the direction finder.

Here, the mobile station may include a third transmitting and receiving device for carrying out radio communications with another mobile station traveling behind, and the third transmitting and receiving device may comprise a transceiver for carrying out radio communications with its party; two or more receiving antennas separated apart by a predetermined distance; a direction finder for determining, in response to a radio signal caught by each of the receiving antennas, an incident angle of the radio signal on the receiving antenna; and a controller for controlling transmitting and receiving of a data packet to and from the party, wherein the second transmitting and receiving device may comprise a function to carry out communications with a third transmitting and receiving device of another mobile station traveling in front of the second transmitting and receiving device, and wherein the controller of each of the third and second transmitting and receiving devices may measure a distance between the third and second transmitting and receiving devices and a direction with respect to each other in response to a transmitting time of the data packet and a received time of the radio signal from the party, and to the incident angle detected by the direction finder.

The transceiver of each of the first and second transmitting and receiving devices may comprise: a packet assembler for assembling data packet to which a synchronizing code is added; transmitting means for modulating an output of the packet assembler and radiating a modulated signal as radio waves; a timer for measuring a time period from transmitting the data packet to receiving a data packet transmitted from the party; a first synchronization detector for detecting the synchronizing code from the output of the packet assembler to start the timer; receiving means for demodulating the data packet from an output from the receiving antenna; a second synchronization detector for detecting the synchronizing code from an output of the receiving means to stop the timer; and a packet disassembler for extracting the data packet from the output of the receiving means, wherein the controller may calculate the distance between the party in accordance with a difference between a transmitting time of a carrier signal of the data packet measured by the timer and a received time of a response signal from the party to the data packet.

The direction finder may comprise: means for shifting a phase of an output of one of the receiving antennas; means for adding an output of the other of the receiving antennas to an output of the shifting means; first detecting means for carrying out square-law detection of an output of the adding means; second detecting means for carrying out square-law detection of the output of the other of the receiving antennas; and calculating means for calculating angles between the station to which the direction finder belongs and the party in response to outputs of the first and second detecting means.

The transceiver of the mobile station and the transceiver of the base station may each transmit or receive the data packet such that collision of the data packet is avoided by assigning the data packet to a slot formed by dividing a predetermined frame time duration.

The base station may comprise a first clock generator for generating a first clock signal in slave synchronism with a master clock, of which information fed through a time division multiplexed transmission line, wherein the mobile station may comprise a second clock generator for generating a second clock signal in slave synchronism with the first clock signal of the base station in response to timing information in a received signal transmitted from the base station, and wherein the mobile communication system may define the slots in response to times indicated by the first and second clock signals.

The mobile station and the base station may each comprise means for sharing connection information representing a connection state between the base station and the mobile station by communicating the connection information with each other, and determine transfer path of the data packet in response to the shared connection information such that the data packet is transferred to a desired destination through the transfer path.

The mobile station and the base station may each determine a transfer path of the data packet in response to position information of the party, and transfer the data packet to a desired destination through the transfer path.

BRIEF DESCRIPTION OF THE DRAWINGS

The objects and features of the present invention will become more apparent from a consideration of the following detailed description taken in conjunction with the accompanying drawings in which:

FIG. 1 is a perspective view showing an outline of an embodiment of an automobile communication system in accordance with the present invention;

FIG. 2 shows how FIGS. 2A and 2B are combined;

FIGS. 2A and 2B are schematic block diagrams showing, when combined as shown in FIG. 2, a mobile station shown in FIG. 1;

FIG. 7 is a schematic block diagram showing an example of the configuration of a receiver shown in FIGS. 2A, 2B and 3;

FIGS. 8A and 8B are schematic block diagrams showing, when combined as shown in FIG. 8, the exemplary configuration of a a synchronizing system in the present embodiment;

FIGS. 9A–9F are schematic diagrams showing an example of the structure of packets in the data link layer, wherein FIG. 9A illustrates the structure of a query packet (QF/QM), FIG. 9B illustrates the structure of a response packet (R), FIG. 9C illustrates the structure of a link request packet (RL), FIG. 9D illustrates the structure of a clear-forward request packet (CL), FIG. 9E illustrates the structure of a data transmission packet (DT), and FIG. 9F illustrates the structure of an acknowledge packet (AC); and FIGS. 10A–10E are schematic diagrams showing an example of the structure of packets in the network layer, wherein FIG. 10A illustrates the structure of an addressing packet, FIG. 10B illustrates the structure of a positioning packet, FIG. 10C illustrates the structure of a destination physical network address (DPA), FIG. 10D illustrates the structure of a source physical network address (SPA), and FIG. 10E illustrates the destination position of the network layer.

DESCRIPTION OF THE PREFERRED EMBODIMENTS

Figure 2B:
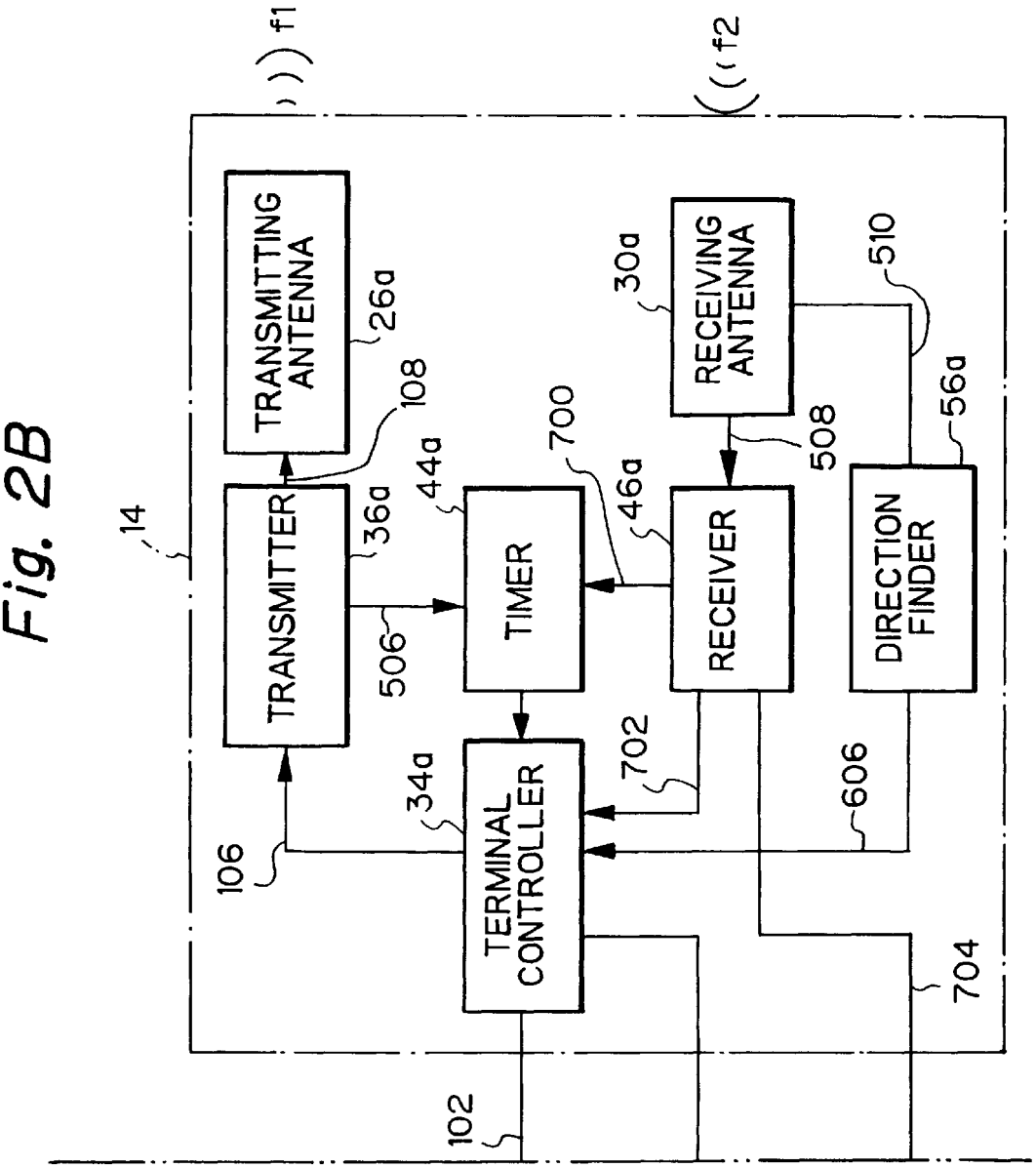

An embodiment of the mobile communication system in accordance with the present invention will now be described with reference to the accompanying drawings.

FIG. 1 shows an embodiment of an automobile communication system to which the mobile communication system in accordance with the present invention is applied. The automobile communication system is an information communication system capable of implementing uninterrupted radio communications not only between a mobile station 10 in each vehicle traveling on an expressway or the like and a base station 12 installed on the roadside, but also between the mobile stations 10 without interposing any other station therebetween. In particular, each mobile station 10 and the base station 12 can identify the location of a party in response to the radio wave emitted from the party in this embodiment. This makes it possible not only to perform traffic control and danger surveillance based on the traffic information collected from the position information of the traveling vehicles, but also to construct a total road traffic system that can implement control and surveillance of the autonomous driving of vehicles.

More specifically, the mobile station 10 mounted on the vehicle traveling on the road includes transceivers 14 and 16. The transceiver 14 is mounted in the front of the vehicle, for example, to communicate with the base station 12 installed in front of it and with the mobile station of a vehicle in front. On the other hand, the transceiver 16 is mounted in the rear of the vehicle to communicate with the mobile station of a vehicle behind it. In addition, the base stations 12 are installed at fixed intervals along the roadside. The base stations 12 each include a base station transceiver 18 for carrying out radio communications with the mobile stations 10. Incidentally, in the following description, those portions which have no substantial relation with the present invention will be omitted from the drawings and the description, and the reference numerals of signals are designated by the reference numerals of connecting lines through which the signals pass.

The base station 12 is mounted on a support post fixed on the shoulder of the road, and the base station transceiver 18 is attached to the tip of a supporting rod extended over the road from the shoulder to carry out radio communications with the mobile stations 10. The base station 12 is connected through a wire or wireless transmission line to a control center which will be described later, so that the control center and a plurality of base stations form a communication network covering a certain extended area over the road as a radio zone.

Next, the mobile station will be described with reference to FIGS. 2A and 2B, when combined as shown in FIG. 2.

The mobile station 10 of this embodiment comprises the transceivers 14 and 16 for carrying out radio transmission to and reception from other stations, a router 20 connected to the transceivers, terminals 22 and a clock 24.

The transceivers 14 and 16 have directional transmitting antennas 26a and 26b and the receiving antennas 30a and 30b directing towards the front and rear of the vehicle, respectively, so that the mobile station 10 establishes through the antennas bidirectional radio-communication channels 2 (see, FIG. 1) between the mobile stations of vehicles traveling in front of and behind it on the same lane or the contiguous lane. The directivity of antennas provided on the base station transceiver 18 as shown in FIG. 1 is directed to a direction opposite to the traveling direction of the mobile station 10 in this embodiment. Thus, direct bidirectional radio-communication channels 4 are established between the base station transceiver 18 and the transceiver 14 of each mobile station 10. Each mobile station 10 communicates with the base station 12 through the communication channel 4 using the transceiver 14, and communicates with other mobile stations through the communication channels 2 using the transceivers 14 and 16. The transceiver 16 may have the same construction as the transceiver 14 except that their transmitting and receiving frequencies are reversed from each other.

The operation of the embodiment will now be described. First, the transceiver 14 (see, FIG. 2B) mounted in the front of the mobile station 10 is connected to the terminals 22 and the transceiver 16 (see, FIG. 2A) through the router 20, so that the transceiver 14 sends transmitting information which is transferred from the terminals 22 and the transceiver 16 through the router 20 in response to a timing control signal fed from the clock 24. Besides, the transceiver 14 provides the router 20 with information received from the base station 12 and other mobile stations, so that the received information is transferred to the intended terminal 22 or the transceiver 16. Similarly, the transceiver 16 is connected to the terminals 22 and the transceiver 14 through the router 20, so that the transceiver 16 sends transmitted information which is transferred from the terminals 22 and the transceiver 14 through the router 20 in response to a timing control signal fed from the clock 24. Besides, the transceiver 16 provides the router 20 with received information, so that the received information is transferred to the intended terminal 22 or the transceiver 14.

The terminals 22 in the present embodiment are an information communication terminal used for information communications such as telephones and data transmission, and a control terminal including a travel controller for carrying out travel control or drive control of the vehicle in response to the position information of the vehicle, an alarm for displaying alarm messages for assuring safe traveling, and a data encoder for collecting the state variables representing the operating and traveling state of the vehicle and for encoding the collected state variables. The terminals 22 acquire packets needed for the control from the router 20 connected thereto through connecting lines 100, and output information to be transmitted to the base station 12 and other mobile stations to the router 20 through the connecting lines 100 after packetizing the transmission information. The terminals 22 have, for example, the functions of acquiring an identifier of a desired party or an information resource from a directory service, and inputting the identifier in response to the operation of a sender as a destination virtual network address DVA.

The router 20 is provided for exchanging packets between the terminals 22 and the transceivers 14 and 16. It is connected to a terminal controller 34a of the transceiver 14 through a connecting line 102, and to a terminal controller 34b of the transceiver 16 through the connecting line 104. The router 20 has the functions of selecting an optimum path to transfer the packets to a desired destination in response to the connection information sent from the related stations, and preparing a the transfer table indicating the optimum paths.

For example, when a packet in a network layer, which is sent from the terminals 22 to the router 20, is an addressing packet, the router 20 carries out address resolution in which the destination virtual network address in that packet is translated to the destination physical network address, and sends the packet to the route designated by the transfer table in accordance with the destination physical network address. The address resolution is implemented, for example, by installing, in a server 76 of a control center 70 (see, FIG. 4) which will be described later, an address database which stores the correspondence between the virtual network addresses and physical network addresses, and by referring to the database. On the other hand, when the packet sent from the terminals 22 to the router 20 is a positioning packet, the router 20 sends the packet to the route designated by the destination position in the packet.

The present embodiment employs, for example, a diffusion cache method to perform the address resolution. In this case, cache memories for the address resolution are provided in the respective terminals 22, router 20 and a router 78 of the control center described later, to store the address of the sender of the packet in the cache at the time the packet is repeated or received. As a result, the routers and the terminals, which store in the caches the destination address in the packet, can carry out the address resolution of the packet without referring to the address database, thereby implementing effective address resolution.

The transfer tables of respective routers share the connection information of the entire network (that is, a link state table LST) by transferring the connection information from each station to the next stations using the routing protocol used in an ordinary computer network. Each router calculates the optimum path to generate the transfer table in accordance with the shared connection information.

The transceiver 14 transmits and receives information to and from the base station transceiver 18 and the mobile stations in the vehicles in front. More specifically, the transceiver 14 includes a terminal controller 34a connected to the input and output of the router 20. The terminal controller 34a is a transmitting and receiving controller that carries out over all control of the transceiver 14 in response to the information sent from the terminals 22 and the timing information fed from the clock 24. The terminal controller 34a inputs a packet to be transmitted from the input 102, and delivers the packet to a transmitter 36a connected to its output 106, and controls the transmitter 36a as well. The transmitter 36a generates a transmission signal with a frequency f1 under the control of the terminal controller 34a, and supplies the transmission signal f1 to the transmitting antenna 26a connected to its output 108.

Figure 5:
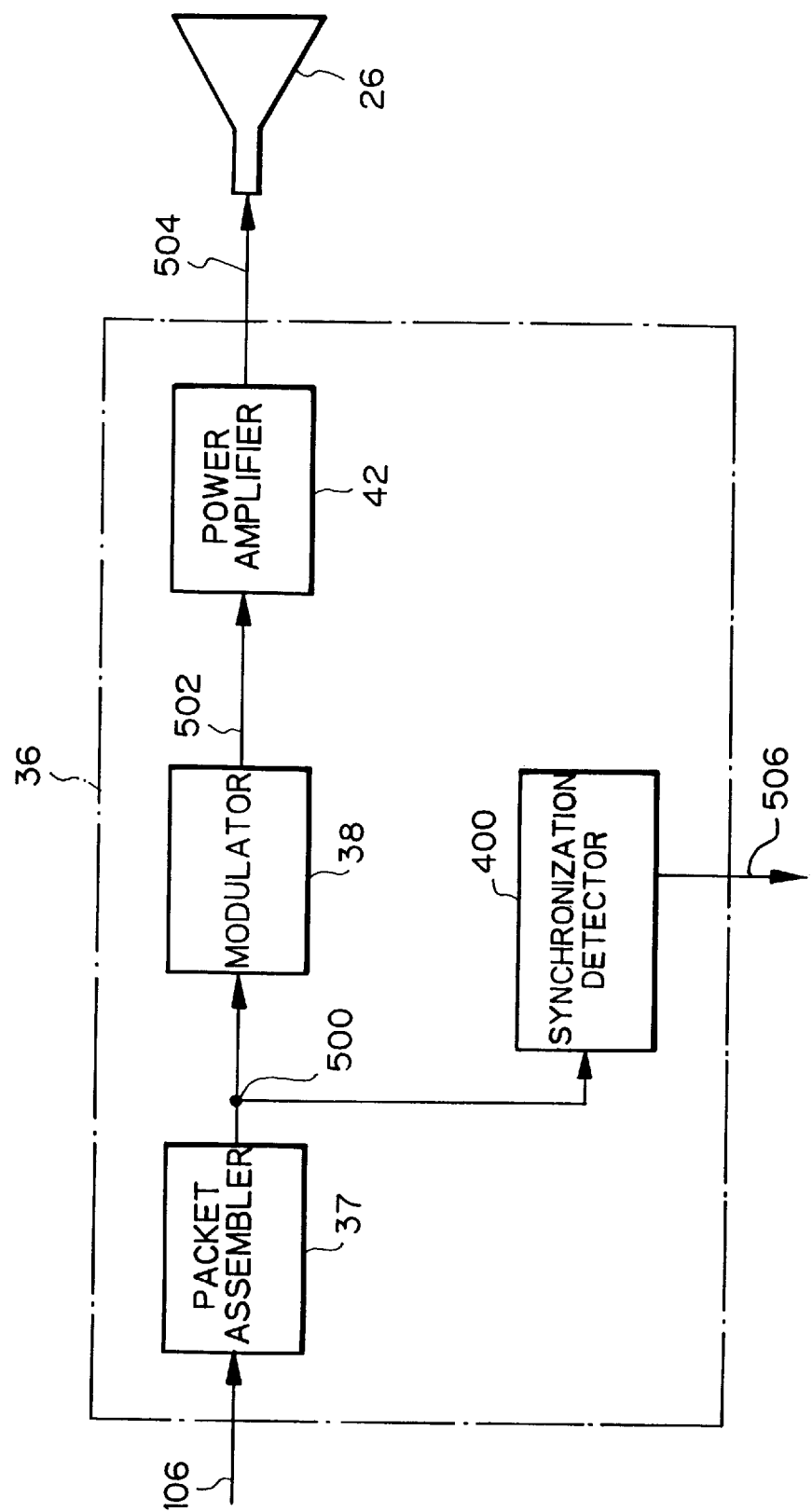
FIG. 5 is a block diagram schematically showing an example of the configuration of a transmitter show FIGS. 2A, 2B and 3.

The transmitter 36a and the transmitting antenna 26a will be described with reference to FIG. 5. The transmitter 36a includes a packet assembler 37 for assembling a data packet including the packet of data sent from the terminal controller 34a. The output 500 of the packet assembler 37 is connected to a modulator 38, and to a synchronization detector 40 as well. The modulator 38 modulates a radio carrier by the data packet applied to the input 500 thereof. The output 502 of the modulator 38 is connected to a power amplifier 42 which power amplifies the signal applied to its input 502, and supplies the power amplified transmission signal to the transmitting antenna 26 through a connecting line 504. The synchronization detector 40 inputs the data packet delivered from the packet assembler 37 to detect a synchronizing pattern in the data packet, and produces from its output 506 the detected synchronizing pattern as a trigger for activating a timer 44a as shown in FIG. 2B.

Returning to FIG. 2B, the receiving antenna 30a is provided for receiving radio waves with a frequency of f2 transmitted from the base station transceiver 18 and the mobile station of a vehicle in front. The receiving antenna 30a in the present embodiment consists of two horn antennas spaced apart by a predetermined interval for determining the incoming direction of the radio waves and supplies an output 508 with a received signal fed from one of the antennas or received signals fed from both antennas, and supplies an output 510 with the received signals fed from both antennas. The output 508 of the antenna 30a is connected to a receiver 46a, and the output 510 is connected to a direction finder 56a.

The receiver 46a comprises, as shown in FIG. 7, an amplifier 48 for amplifying the received signal applied to the input 508, a demodulator 50 for demodulating the signal amplified by the amplifier 48, a synchronization detector 52 for detecting the synchronizing pattern in the demodulated data output from the demodulator 50, and a packet disassembler 54 for extracting necessary data from the demodulated data in synchronism with the synchronizing pattern. The demodulator 50 of this embodiment is one that demodulates a binary phase-modulated, transmitted signal sent from another mobile station or the base station transceiver. If the transmitted signal is subjected to another type of modulation, then demodulation corresponding to the modulation is used. The synchronization detector 52 produces a trigger signal from its output 700 for stopping the operation of the timer 44a (see, FIG. 2B) in response to the detected synchronizing pattern. The packet disassembler 54 extracts necessary data from the output data of the demodulator in response to the synchronizing pattern detected by the synchronization detector 52, and produces the extracted data from its output 702. The output 700 of the receiver 46a is connected to the timer 44a as shown in FIG. 2B, and the output 702 is connected to the terminal controller 34a. The output 704 of the receiver 46a is connected to the clock 24 to supply the clock 24 with setting information for carrying out the initial set of the clock at the start of the communications with other station.

Figure 6:
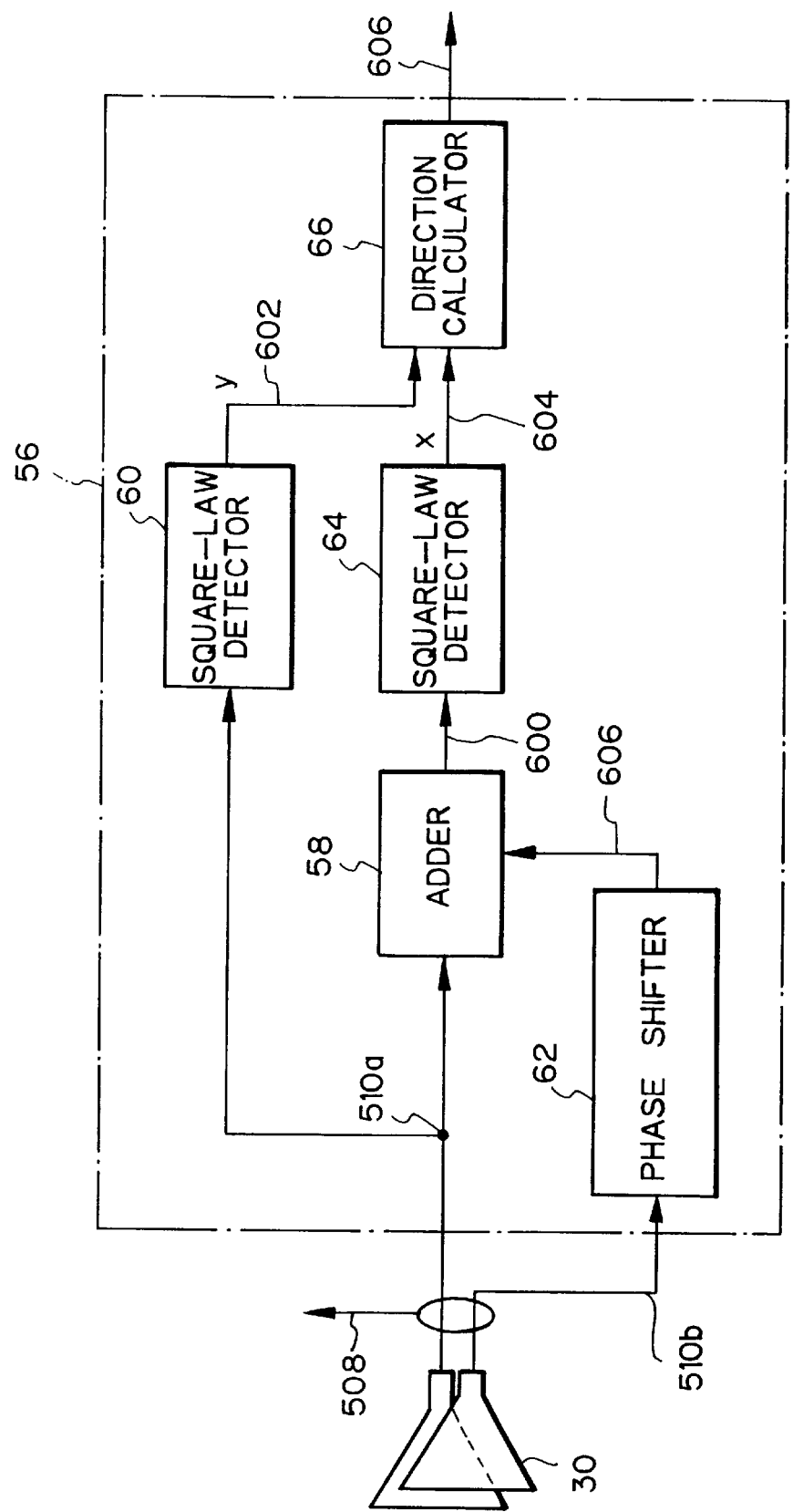
FIG. 6 is a schematic block diagram showing an example of the configuration of a direction finder shown in FIGS. 2A, 2B and 3.

The direction finder 56a connected to the other output 510 of the receiving antenna 30 comprises, as shown in FIG. 6, an adder 58 and a square-law detector 60 each connected to one output 510a of the receiving antenna, a 90 degree phase shifter 62 connected to the other output 510b of the receiving antenna, a square-law detector 64 connected to an output 600 of the adder 58, and a direction calculator 66 for calculating the incoming direction of the radio wave of the received signal on the basis of the outputs 602 and 604 of the square-law detectors 60 and 64.

The adder 58 receives at its input 606 the received signal output from the 90 degree phase shifter 62 after the 90 degree phase shift, and adds the received signal 606 and the received signal 510a, thereby delivering the addition result to the square-law detector 64 through the connecting line 600. The square-law detectors 60 and 64 are detectors that squares the input received signal. More specifically, assuming that the distance between the center points of the two horn antennas of the receiving antenna 30 is d, the incoming direction of the received signal with respect to the radiation axis of the antenna is $\Theta$, the wavelength of the radio wave is $\lambda$, the amplitude of the signal is A, and the ratio of the circumference of a circle to its diameter is $\pi$, the square-law detector 60 performs the following calculation (1) on the input signal 510a, thereby obtaining the output y.

$$y = A^2/2 \qquad (1)$$

The square-law detector 64 performs the following calculation (2) on the input signal 600, thereby obtaining the output x.

$$x = A^2 \{1 + \sin(2\pi d/\sin \Theta)\} \qquad (2)$$

The direction calculator 66 performs the following calculation (3) on the outputs y and x of the square-law detectors 60 and 64, thereby obtaining a measured value $\Theta$ corresponding to the incoming direction of the signal.

$$\Theta = \sin^{-1} \{\lambda/2\pi d \sin^{-1}(x/2y - 1)\} \qquad (3)$$

The direction calculator 66 outputs the calculated measured value $\Theta$ to the terminal controller 34a connected thereto through the connecting line 606.

Returning to FIG. 2A, the clock 24 generates timing information using the synchronizing pattern output from the receiver 46 as a reference. The clock 24 supplies the generated timing information to the terminal controllers of the transceivers 14 and 16.

The transceiver 14 mounted in the front of the mobile station 10 has an arrangement as described above. The transceiver 16 mounted in the rear of the mobile station 10 comprises, as shown in FIG. 2A, a transmitter 36b and a transmitting antenna 26b which output radio waves with a frequency of f2, and a receiving antenna 30b and a receiver 46b which receive the radio wave with a frequency of f1. The transceiver 16 differs from the transceiver 14 in that it performs radio communications with the mobile station in a vehicle behind rather than the base station transceiver 18 in this embodiment. The other functions of the transceiver 16 may be the same as those of the transceiver 14. Thus, the components of the transceiver 16 are designated by the same reference numerals as those of the transceiver 14 except that their suffix is changed to "b" from "a".

Returning to FIG. 1, the base station 12 will be described. The base station 12 is a fixed station including the base station transceiver 18 which transmits, on one hand, the received information from the mobile stations 10 to the control center and other base stations including adjacent base stations, and transmits, on the other hand, the received information from the control center and the base stations to the mobile stations 10.

Figure 3:
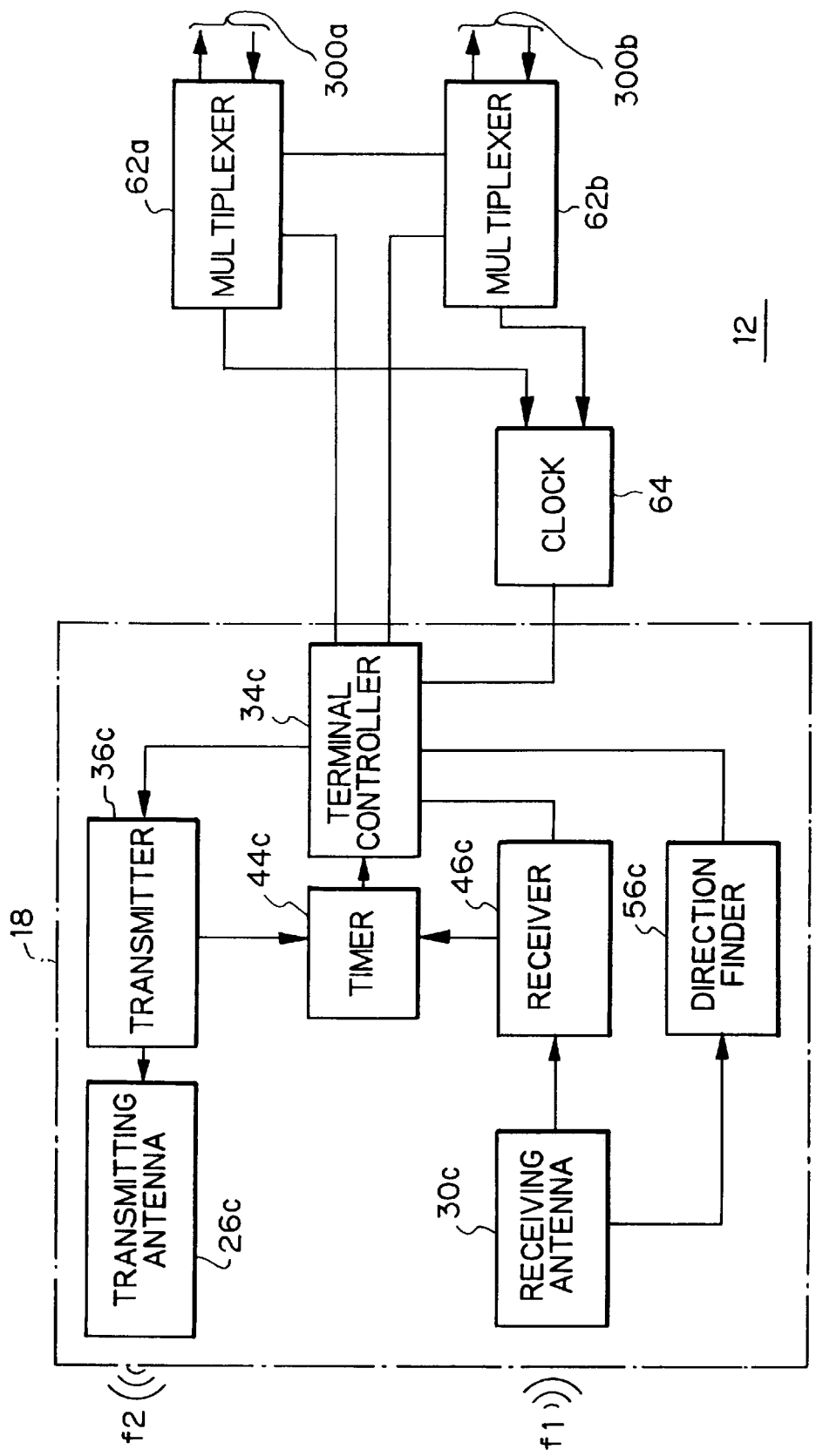
FIG. 3 is a schematic block diagram exemplarily showing the configuration of a base station shown in FIG. 1.

More specifically, the base station 12 comprises, as shown in FIG. 3, the base station transceiver 18; multiplexers 62a and 62b, and a clock 64. The multiplexers 62a and 62b interconnect the base station 12 and the adjacent base stations through bidirectional transmission lines 300a and 300b. The clock 64, synchronized to the clock signal of the upper control center based on synchronizing information fed from the multiplexers, controls the timing of the transmitted signal sent from the base station transceiver 18.

The base station transceiver 18 comprises a terminal controller 34c connected to the multiplexers 62a and 62b, a transmitter 36c that outputs data packets delivered from the terminal controller 34c as a transmission signal, a transmitting antenna 26c for radiating the transmission signal in the form of radio waves, a receiving antenna 30c for receiving the radio waves transmitted from the mobile stations, a receiver 46c, a direction finder 56c, and a timer 44c, all of which may be the same as those of the transceiver 16 as shown in FIG. 2A. Only, the transmitting antenna 26c and the receiving antenna 30c in the present embodiment have a directivity opposite to the traveling direction of the vehicles, that is, a directivity that forms a radio zone in the direction towards the rear of the lane.

Next, referring to FIG. 4, the control center and its connection to the base station 12 through transmission lines 300 will be described. In this embodiment, a transmission line 300a of a base station 12a is connected to a control center 70, and the other transmission line 300b of the base station 12a is connected to another adjacent base station 12b. The base station 12b is connected to still another base station 12c through a transmission line 300c, and the base station 12c is connected to the control center 70 through the transmission line 300d. Thus, the control center 70 forms a loop with the multiple base stations 12a, 12b and 12c through the transmission lines 300 (i.e. 300a–300d).

The control center 70 comprises multiplexers 72a and 72b connected to the base stations 12a and 12c through the transmission lines 300a and 300d, respectively, a clock 74 for supplying the multiplexers 72 (72a and 72b) with a clock signal functioning as a time reference of the entire system, and a router 78 for carrying out the packet switching between the multiplexing devices 72 and servers 76 (76a–76c, in this figure).

The transmission lines 300a and 300d connected to the multiplexers 72a and 72b include many time division multiplexed channels, each of which is assigned to the packet transmission between the control center 70 and each one of the base stations 12. The multiplexers 72 receive the packets sent from the base stations 12 through the assigned channels, and transfer the packets to the router 78. The clock 74 not only generates the clock signal as a reference for the system, and supplies it to the multiplexers 72, but also measures the received time of the synchronizing signal included in the output signals of the multiplexers 72, so that it determines the delay time of the transmission lines needed for synchronizing the clock of respective base stations 12. The router 78 carries out packet switching among the base stations 12a, 12b and 12c, as well as between the base stations 12 and the servers 76, and at the same time between the control center and external systems connected thereto via transmission lines 400.

The router 78 of the control center 70 has the same function as that of the router 20 of each mobile station. Thus, the router 78, together with the router 20 of each mobile station, sends the network layer packets to their destinations designated by their destination address or their destination position via optimum paths. The router 78 further includes a list of the mobile stations 10 for determining the path of each packet, in which list are entered the mobile stations, for each base station 12, which have a direct link with that base station 12. The router 78 updates the list of the mobile stations 10 everytime the handoff of any one of the mobile stations 10 occurs. The router 78, however, does not change the link state table for every handoff of the mobile stations 10. As a result, it is not necessary for the router 78 to recalculate the optimum paths for each handoff.

Figures 8, 8A:
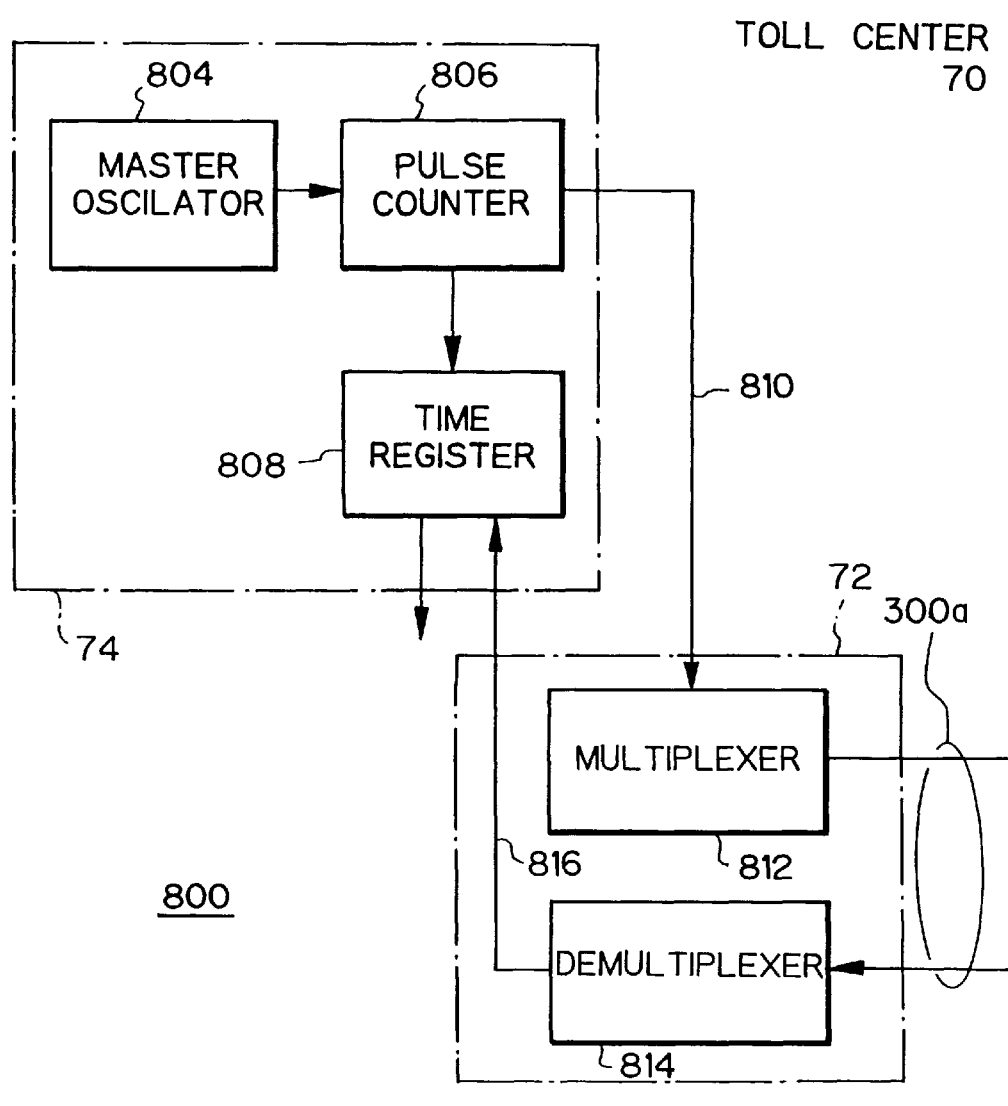
FIG. 8 shows how
FIGS. 8A and 8B are combined.
Figure 8B:
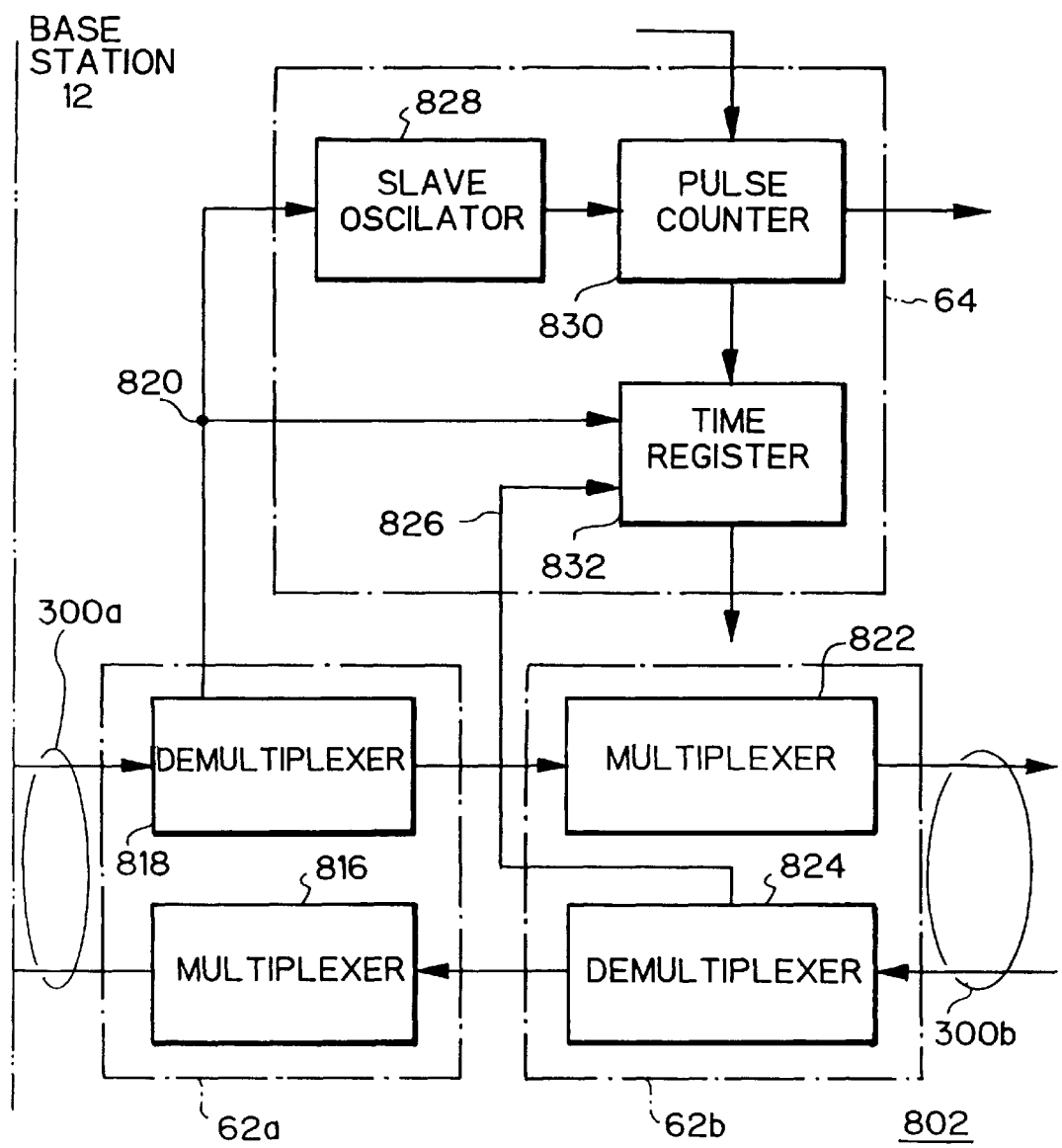

Next, the synchronizing system of this system will be described with reference to FIGS. 8A and 8B. The synchronizing system 800 of the control center 70 includes a clock 74 and a multiplexer 72, and the synchronizing system 802 of each base station 12 includes a clock 64 and multiplexing devices 62a and 62b.

The clock 74 of the synchronizing system 800 comprises a master oscillator 804 for generating a high accuracy reference oscillating signal, a pulse counter 806 for generating the reference time of the entire system on the basis of the reference signal output from the master oscillator 804, and a time register 808 for reading and storing the content of the pulse counter 806 in response to a trigger signal. The pulse counter 806 generates a synchronizing signal in accordance with the reference time of the system, and supplies the generated synchronizing signal to the multiplexer 72 via a connecting line 810. The multiplexer 72 comprises a multiplexer 812 and a demultiplexer 814. The multiplexer 812 multiplexes the synchronizing signal applied to the input 810 and data packets transferred from the router 78, and sends the multiplexed signal to the transmission line 300a. The demultiplexer 814 demultiplexes the data which is input through the transmission line 300a into data packets and the synchronizing signal, and transfers the data packets to the router 78, and the synchronizing signal to the clock 74. An output 816 of the demultiplexer 814 is connected to the time register 808, and supplies the time register 808 with the synchronizing signal as the trigger signal for reading out the contents of the pulse counter 806 to be stored in the time register 808.

On the other hand, the multiplexer 62a of the synchronizing system 802 comprises a multiplexer 816 and a demultiplexer 818. The demultiplexer 818 extracts the synchronizing signal from the data transmitted through the transmission line 300a to be supplied to the clock 64 connected to its output 820, separates from the data sent from the control center 70 the data packets addressed to this base station 12 to be supplied to the transceiver 18, and sends the remaining data packets to a multiplexer 822 of the multiplexer 62b. The multiplexer 816 multiplexes the data packets transferred from the multiplexer 62b and data packets to be sent from this base station 12 to the control center 70, so that the multiplexed data are sent to the multiplexer 72 of the toll center 70 through the transmission line 300a.

The multiplexer 62b of the synchronizing system 802 comprises a multiplexer 822 and a demultiplexer 824. The multiplexer 822 multiplexes the data packets transferred from the multiplexer 62a and data packets to be sent from this base station 12 to the control center 70, and sends the data through the transmission line 300b. The demultiplexer 824 extracts from the data transmitted through the transmission line 300b the synchronizing signal to be supplied to the clock 64 connected to its output 826, separates from the data sent from the control center 70 the data packets addressed to this base station 12 to be supplied to the transceiver 18, and transmits the remaining data packets to the multiplexer 816 of the multiplexer 62a.

The clock 64 of the synchronizing system 802 comprises a slave oscillator 828 for generating a signal synchronized in frequency with the synchronizing signal applied to its input 820, a pulse counter 830 for generating the reference time used in the base station 12 in synchronism with the reference time of the entire system, and a time register 832 for storing the content of the pulse counter 830 in response to trigger signals, that is, the synchronizing signal 820 fed from the multiplexer 62a and the synchronizing signal 826 fed from the multiplexer 62b.

Next, structures of data link layer packets in the present embodiment will be described with reference to FIGS. 9A–9F. The types of the data link layer packets are classified into a query packet (QF/QM) 900, a response packet (R) 902, a link request packet (RL) 904, a link clear packet (CL) 906, a data transmission packet (DT) 908 and an acknowledge packet (AC) 916. Each of these packets includes a preamble (PRE) and a synchronizing flag (SYNC) consisting of a code sequence for starting a synchronizing circuit and determining the position of the packet; a type (TYP) representing the type (QF/QM/R/CL/DT/AC) of the packet; a source address (SA); a destination address (DA); a time offset (OFF) representing a time delay from signal reception to response thereto; a message number (MN) consisting of a serial number which is incremented by one every time a communication is established; data (DATA) consisting of data to be transmitted or a network layer packet; time control data (TC) consisting of control information for adjusting the time of a clock; and an error detecting and correction code (EDC), an additional code for detecting and correctingcode errors of the packet.

More specifically, as shown in these figures, the query packet (QF/QM) 900 and the response packet (R) 902 include the preamble (PRE) and the synchronizing flag (SYNC), the type (TYP), the source address (SA), and the error detecting and correction code (EDC). The response packet (R) 902 further includes the destination address (DA) and the time offset (OFF). The link request packet (RL) 904 and the link clear packet (CL) 906 each includes the preamble (PRE) and the synchronizing flag (SYNC), the type (TYP), the source address (SA), the destination address (DA), and the error detecting and correction code (EDC). The data transmission packet (DT) 908 includes the preamble (PRE) and the synchronizing flag (SYNC), the type (TYP), the source address (SA), thedestination address (DA), the message number (MN), thedata (DATA), the time control data (TC) and the error detecting and correction code (EDC). The acknowledge packet (AC) 910 includes the preamble (PRE) and the synchronizing flag (SYNC), the type (TYP), the source address (SA), the destination address (DA), the message number (MN), the time offset (OFF) and the error detecting and correction code (EDC).

The network layer packets in the present embodiment fall into an addressing packet 1000 and a positioning packet 1002 as shown in FIGS. 10A and 10B. The addressing packet 1000 includes a destination virtual network address (DVA), a destination physical network address (DPA), a source virtual network address (SVA), a source physical network address (SPA), a header (HD) of the network layers except for those designated as the destination and the source, and data (data) including data to be transmitted or data representing a packet of an upper layer. The positioning packet 1002 includes a destination position (DP), a source address (SA), a header (HD) of the network layers except for those of the destination and the source, and data (data) including data to be transmitted or data representing a packet of an upper layer. The virtual network address is an identifier of an individual or an information source, and the physical network address is information representing their positions. The destination position (DP) is information representing the relative position of the destination vehicle with respect to the sender position.

A destination physical network address (DPA) 1004 and a source physical network address (SPA) 1006 include, as shown in FIGS. 10C and 10D, the identifiers of a "road number" representing the road on which the vehicle associated with the current mobile station 10 is traveling, a "group number" representing the vehicle group to which the vehicle belongs, a "vehicle number" representing the vehicle, and a "terminal number" representing the terminal.

The destination position (DP) 1008 of a packet includes, as shown in FIG. 10E, a "relative position" representing the relative position of the destination position, that is, the destination vehicle or vehicles that are traveling in front of and/or behind, a "distance" representing the distance to the destination position in terms of meters or the number of vehicles, and a "direction" representing the direction of the destination position such as straight, right, left, or all of them. For example, the destination position described as the "relative position" is <behind>, the "distance" is <three vehicles>, and the "direction" is <straight> indicates that "the three vehicles traveling just behind in the same lane". In addition, if the destination position described as the "relative position" is <both>, the "distance" is <100 m>, and the "direction" is <all>indicates "all the vehicles traveling within 100 meters in front of or behind".

The operation of the embodiment of the automobile communication system with the above-described arrangement will now be described. First, each mobile station 10 communicates with the base station 12 and other mobile stations 10 at a period of position measurement which is carried out at a predetermined frequency. In the present embodiment, the frequency of the position measurement of the mobile station 10 is preferably set at about 20 times per second. Thus, the fundamental period of the position measurement of the vehicle is about 50 ms, and a time frame is set in accordance with the fundamental period. The frame is divided into many slots, and the communications between each mobile station 10 and the base station 12, and between the mobile stations 10 are carried out by occupying one of the slots. In other words, each one of the slots is assigned to each data link for the communications. Besides the position measurement of the vehicles, normal data communications is performed by adding, to the data packets which are used for the position measurement, information to be transmitted between the mobile station 10 and the base station 12, between the mobile stations 10, and between the mobile station 10 and service providers of external systems.

Each mobile station 10 requests the base station 12 to assign a slot at the start of communications. In this case, the mobile station 10 recognizes the communication state of other mobile stations by monitoring the transmitted signals from the base station 10 and other mobile stations with its own receivers 46a and 46b, thereby detecting a vacant slot (initial acquisition).

When the vacant slot is detected in the initial acquisition, the mobile station 10 sends a request for using a vacant slot from the transceiver 14. The use request includes two types: one for establishing a data link between the mobile station 10 and the base station 12, and the other for establishing a data link between the mobile stations 10.

First, the mobile station 10, which tries to establish the data link between the base station 12, sends a query signal (QF) requesting slot assignment to a vacant slot in a frame. When a response signal (R) is sent back to the request from the base station 12, the slot assignment is achieved. Thus, the data link is established between the mobile station 10 and the base station 12, and the communication is started from the next frame using this slot. On the other hand, when no response to the query signal (QF) is sent back from the base station 12, the mobile station 10 recognizes that a request collision occurs with a request from other mobile stations, and resends the query signal (QF) after selecting another vacant slot. If there is still no response from the base station 12, the mobile station 10 considers that the path between the base station 12 is interrupted, or that a base station 12 is not installed, and tries retransmission of the request with a reduced frequency of the request transmission.

On the other hand, the base station 12 sends back the response signal (R) to a query signal (QF) which is correctly received. When the base station 12 recognizes that the data packet is sent from the same mobile station 10 in the same slot of the next frame, a data link is established, thereby starting the communications.

With regard to the use request for establishing a data link between the mobile stations 10, the mobile station 10 sends a query signal (QM) which requests assignment to the mobile station of a vehicle in front by using the vacant slot detected in the initial acquisition. When at least one response signal (R) is sent back to the request from the mobile station, and is correctly received, the mobile station 10 considers that the assignment is achieved, and starts communications with the mobile station by selecting one of the response signals and by sending a data packet in the same slot of the next frame. When requesting to establish a plurality of links with other mobile stations, the mobile station 10 sends other query signals consecutively.

On the other hand, when a response signal (R) is received including error information, and no recovery is possible with the error, the mobile station 10 considers that responses from the mobile stations of multiple vehicles in front collide, and hence resends a query signal (QM) for requesting reassignment. In the case where no transmitted signal from the mobile stations of vehicles in front is detected and no response is obtained in the initial acquisition, the mobile station 10 considers that there are no vehicles in front of it, and reduces the frequency of sending the request. If the mobile station of a vehicle in front is detected, but no response is obtained from it, the mobile station 10 considers that the collision of requests occurs in the mobile station of the vehicle in front, and resends the request (QM) by changing a slot to another vacant slot.

On the other hand, the mobile station that correctly receives with the transceiver 16 the query signal (QM) requesting the assignment, sends back the response packet (R) in the slot after a pseudorandom delay time (offset time). In this case, the mobile station enters the value of the offset time in the OFF portion of the response packet. When the mobile station 10 that sent the request sends the data packet in the same slot of the next frame, the mobile station receiving it recognizes that the assignment of the slot is achieved and the communication is started, and sends back the data packet using that slot. After that, the communication is continued occupying the slot.

Two other requests are present: a link request for establishing a link between a known party; and a disconnection request for disconnecting the established link. These requests are used, for example, to reestablish a link when a link currently communicating undergoes interference. In this case, the mobile station 10 sends the link request signal (RL) to the party in the assigned slot. The party, receiving the signal, sends back a response signal (R) in the same slot. When the response signal is received, the mobile station 10 considers that the link is established, and starts the communication from the next frame. When disconnecting an unnecessary link, it sends the link crear (CL).

The mobile stations 10 and the base station 12 perform the initial set of the clock at the first communication, and subsequently continue communications for position measurement and information transmission at the fixed frame period. More specifically, the mobile station 10 transmits from the transceiver 14 the data transmission packet (DT) at the frame period using the radio-frequency f1, and starts the timer 44a at the same time. The transceiver 16 of the vehicle in front or the transceiver 18 of the nearby base station 12, which receives the signal, has the direction finder 56b or 56c, and measures the incoming direction of the signal, so that the measured result $\Theta$ is sent to the terminal controller 34b or 34c. At the same time, the transceiver 16 or 18, sends back the acknowledge packet (AC) to the sender of the data transmission packet at the radio-frequency f2 after the offset time OFF, and simultaneously starts the timer 44b and 44c. The offset time OFF is entered in the OFF portion of the acknowledge packet. On the other hand, the transceiver 14, which receives the acknowledge packet, stops the timer 44a, and has the direction finder 56a, measures the incoming direction of the signal so that the measured value $\Theta$ and the content of the timer 44a are transferred to the terminal controller 34a. Reversely, the transceiver 16 of the vehicle in front or the transceiver 18 of the base station 12 also sends a data transmission packet to the transceiver 14 of the mobile station 10, and an acknowledge packet is send back from the mobile station 10. The offset times of respective acknowledge packets are selected such that the data transmission packets and the acknowledge packets do not overlap in the bidirectional transmission.

The terminal controller 34a of each vehicle calculates the distance between the vehicle in front or the roadside base station 12 on the basis of the difference between the measured time of the timer 44a and the offset time OFF in the acknowledge packet. In addition, it calculates the relative position of its vehicle with respect to the position of the base station 12 or of the vehicle in front by combining the distance with the measured value $\Theta$ of the incoming direction of the acknowledge packet. Likewise, the base station 12 or the mobile station of the vehicle in front, which receives the data transmission packet, calculates the distance between the party on the basis of the difference between the measured time of the timer 44c or 44b and the offset time OFF in the acknowledge packet, and then calculates the relative position of the vehicle with respect to the position of the base station or of the vehicle in front by combining the distance with the measured value $\Theta$ of the incoming direction of the radio wave. The position measurement is also performed in the slot assignment request.

The base station 12 always detects the received timings of the received signals during communications, and informs the mobile stations 10 of the deviation values of the timings with respect to the slot boundary by entering the values in the TC portion of the data transmission packet. The mobile stations 10 correct the error of their clock in accordance with the received time control data in the TC portion, thereby correcting the drift of the signal.

The router 20 of the mobile station sends to the designated route the network layer packet transferred from the transceivers 14 and 16, and the terminals 22. When an addressing packet is transferred, the router 20 sends it to the route designated by the transfer table in accordance with the destination physical network address (DPA). When a positioning packet is transferred, the router 20 sends it to the route designated by the destination position (DP). Generally, a single data transmission packet of a data link layer transmits a plurality of network layer packets.

The sender associated with the mobile station 10 finds the identifier of an intended party or of an information resource desired to access by using a directory service or the like, and inputs it to the terminals 22 as the destination virtual network address. The address resolution that converts the identifier to the corresponding physical network address can be implemented by referring to the address database (a reference table between the virtual network addresses and the physical network addresses) installed in the servers 76

Figure 4:
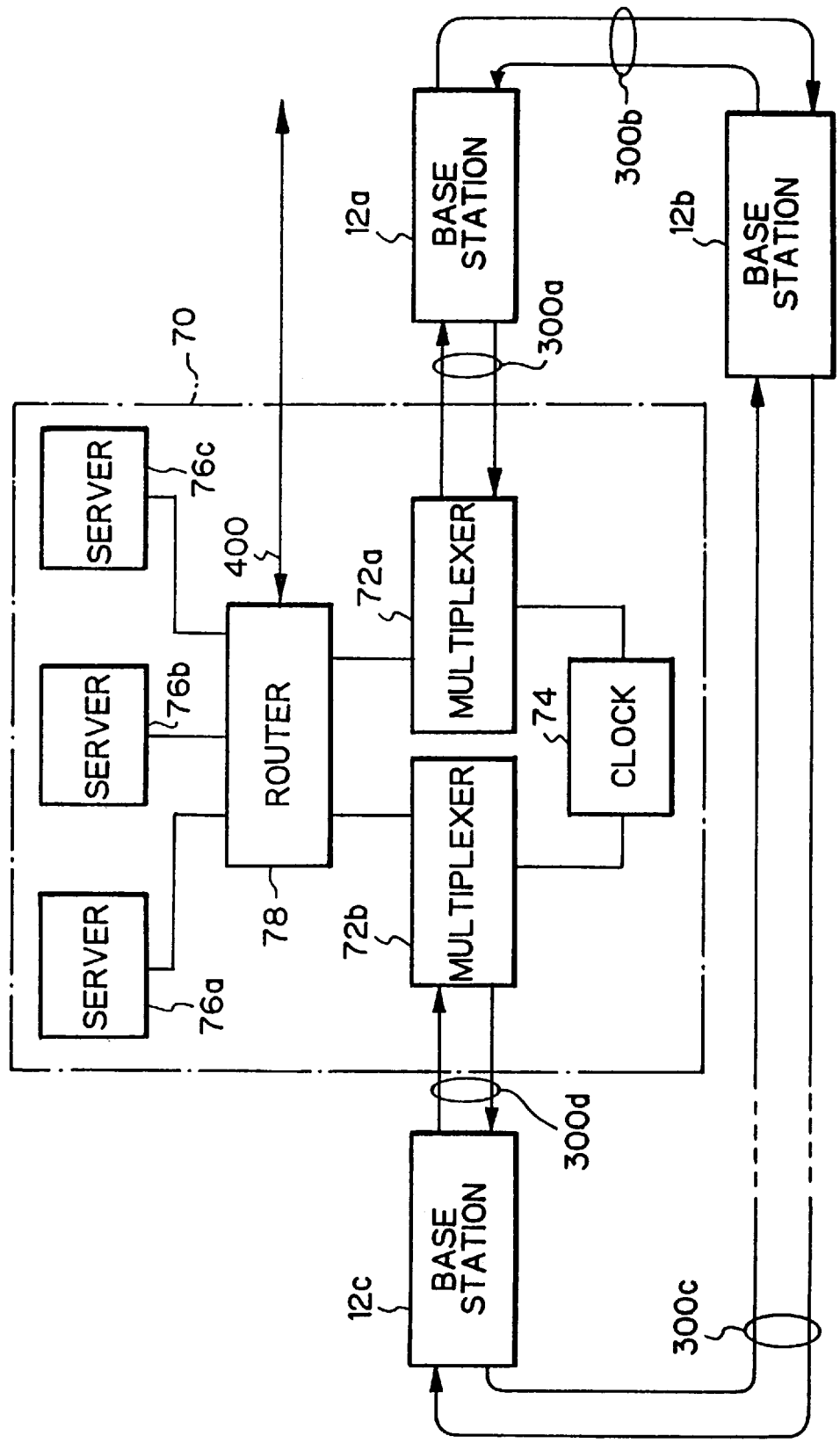
FIG. 4 is a schematic block diagram showing an example of the configuration of a control center, and its connection with the base station shown in FIG. 1.

(see, FIG. 4). The correspondence between the individual identifier of a crew member of each vehicle and the physical network address is registered in the database when the vehicle accesses the base station 12, and the registered item is updated when the road number/group number is changed in response to its traveling.

To achieve effective address resolution, the "diffusion cache method" can be employed. In this case, a cache memory for carrying out the address resolution is provided in the terminals 22 or the router 20, and the address of the sender of a packet is registered in the cache memory when relaying or receiving the packet. The router 20 and terminals 22 that store the destination address of a packet can perform the address resolution without accessing the address database.

In the control center 70, the router 78 sends a network layer packet transmitted from the servers 76a, 76b and 76c, external transmission systems, or the base stations 12a, 12b and 12c through the transmission lines 300a, 300b, 300c to the route designated by the transfer table.

Thus, the network layer packets are sent through optimum paths to their destinations designated by the destination addresses or the destination positions by the operation of the routers 20 and 78 of the mobile stations and the control center. The transfer table of each router can employ the routing protocol used in a common computer network as described in R. Perlman, "Interconnections", Softbank, 1995, pp. 210–222, for example. In this embodiment, the transfer table of respective routers is prepared by the routers themselves, each of which calculates the optimum paths on the basis of the connection information of the entire network shared by all the stations by exchanging the connection information between the adjacent stations (link state table LST).

To calculate the optimum paths, it is important to know whether the mobile station 10 is linked to the control center 70 through any base station 12 and not important to know which base station 12 is passed through. Thus, the base station 12 is considered as merely a part of the link in the link state table LST. The router 78 of the control center 70, however, has for each base station 12 a list of mobile stations 10 that establish immediate links with that base station 12, and updates the list whenever the handoff occurs of the mobile stations 12 so that transmission destinations are determined in accordance with the updated list. On the other hand, it is not necessary to update the link state table LST whenever the handoff of the mobile stations occurs, or to recalculate the optimum paths at each time. For example, when the mobile station 10 cannot establish an immediate data link with the base station 12 because of a radio wave propagation failure due to vehicles in front, this state is reflected in the connection information, so that a roundabout route is automatically established which uses the mobile stations of the vehicles in front as relay stations.

On a heavy traffic road, it is possible that smooth information communication may be hindered because of an increase in the load of transferring the connection information for the path control, and of calculating the optimum paths. To deal with this problem, hierarchical path control can be adopted in which the vehicles traveling on a road are divided into vehicle groups of an appropriate size in accordance with the group number of the network address so that the network is divided into multiple subnetworks each including one of the vehicle groups and the control center 70. To implement the hierarchal path control in this embodiment, the router 78 of the control center 70 is logically divided into multiple subrouters so that each subrouter handles the path control to each one of the subnetworks. Each subrouter includes links to upper stations and other subrouters, and as a level 2 subrouter has link information not only within the subnetwork but also between other level 2 subrouters. On the other hand, the router 20 of each mobile station 10 remains a level 1 router having only the link information within the subnetwork.

The destination designation by means of position utilizes the position measurement function of the mobile station 10, in which the transfer route is directly determined in accordance with the position information about the party between which an immediate data link is established without using the transfer table. In this case, the router 20 of the mobile station 10 decodes the destination position (DP) in the received network layer packet, and sends it to the designated route after adding necessary correction. This makes it possible to start communications between the mobile stations on a road on which the base station 12 is not installed.

In the transmitter 36a, the packet assembler 37 assembles a data link layer packet based on the data transferred from the terminal controller 34a, and the packet is transferred to the modulator 38 in a bit serial manner at the occurrence of the transmission trigger signal. The modulator 38 carries out the binary phase modulation of the input signal, followed by power amplification by the power amplifier 42, and transmission from the transmitting antenna 26. The packet output from the packet assembler 37 is also transferred to the synchronization detector 40 which generates, when the synchronizing signal is transmitted, the trigger signal which starts the timer 44a. The transmitters 36b and 36c operate in the same manner as the transmitter 36a.

The direction finder 56a calculates the values x and y by the foregoing equations (1) and (2). Subsequently, the direction calculator 66 calculates the measured value $\Theta$ of the incoming direction of the signal on the basis of the values x and y. The direction finders 56b and 56c operate in the same manner as the direction finder 56a.

In the receiver 46a, one output signal of the receiving antenna is amplified by the amplifier 48, and then fed to the synchronization detector 52 after demodulated into binary data through the demodulator 50. The synchronization detector 52 generates the trigger signal when the synchronizing code is detected in the data link layer packet. The trigger signal stops the timer 44a, and has the packet disassembler 54 read the demodulated packet. The packet disassembler 54 disassembles the packet and transfers the necessary data to the terminal controller 34a. The receivers 46b and 46c operate in the same manner as the receiver 46a.

The mobile station 10 of each vehicle transmits a data packet from the transceiver 14, and awaits the arrival of an acknowledge packet. When the acknowledge packet is correctly received, one information transmission has been completed. After completing the transmission, the mobile station 10 increments the message number MN by one, acquires new data from the terminal controller 34a, and assembles the next data transmission packet. On the other hand, if the acknowledge packet includes an unrecoverable error or if the communication abnormally terminates because the acknowledge packet is not received and so on, the mobile station 10 transmits the same data packet at the next transmission period without updating the message number MN and the data DATA. The reverse transmission from the base station transceiver 18 is carried out in the same fashion.

If we call the service area of a base station 12 a cell, and install a plurality of the base stations 12 such that the cells overlap with each other in part, continuous communication channels can be established between the control center 70 and the mobile stations 10 of the vehicles. Although responses from a plurality of base stations 12 can occur to one query packet in an area in which the cells overlap, interference between the response packets will not occur as long as the clocks of the entire base stations 12 are synchronized because the response packets arrive at different times. In addition, since the overlap of slots between the contiguous cells is substantially smaller than the slot width as long as the cell size is moderate, almost all the time in the slot can be used for the data transmission.

The clocks 64 of all the base stations 12 are slave synchronized with the clock 74 of the control center as follows: In the control center 70, the multiplexer 812 periodically generates the synchronizing signal at the reference points of the pulse counter 806 of the clock 74. The generated synchronizing signal is sent to all of the base stations 12 through the transmission lines 300a, 300b, . . . . In the base station 12, the demultiplexer 818 detects the synchronizing signal, and supplies the detected synchronizing signal to the slave oscillator 828, so that the oscillation frequency of the slave oscillator 828 is synchronized to the master oscillator 804 of the control center 70. At the same time, the demultiplexer 818 has the time register 832 read the content T1 of the pulse counter 830 at the detection time of the synchronizing signal. On the other hand, the synchronizing signal is sent from the base station 12 to the control center 70 through the transmission lines 300b and 300a, so that the demultiplexer 824 of the base station and the demultiplexer 814 in the control center 70 detect the synchronizing signal, and have the time registers 832 and 808 read the contents T2 and T3 of the pulse counters 830 and 806. Then, the content T3 is transmitted from the control center 70 to the base station 12 so that the base station 12 can obtain the following:

$$\Delta T = (T3 - T1 - T2)/2 \quad (4)$$

Since ΔT represents the delay of the clock of the base station 12, leading the pulse counter by that value makes it possible to synchronize the time, thereby completing the slave synchronization of the clock of the base station 12 to the clock of the control center 70.

As described above, the present embodiment establishes continuous packet communication channels suffering from little interference between traveling vehicles, or between the traveling vehicles and the roadside fixed communication network. This makes it possible to automatically set roundabout routes passing through other mobile stations or base stations, and to implement various types of continuous information communication such as data transmission or telephone. At the same time, since the mobile stations and base stations each have a position measurement function in this embodiment, the positions of the mobile stations of the traveling vehicles can be obtained. The information can be used for traffic control, traffic statistics collection, or danger monitoring. Furthermore, the platooning or autonomous driving of vehicles can be achieved which requires the communications of control data between the mobile stations. Thus, one such system can meet the requirements for information communication and driving control, which enables the system to be widely used in common as an information infrastructure on roads. In addition, using the communications between the traveling vehicles and the position measuring function facilitates the information communication even when the mobile stations travel on a road on which no base station is installed, thereby implementing the driving control such as the platooning or autonomous driving.

Although horn antennas are used as the transmitting antennas and receiving antennas in this embodiment, other antennas having equivalent performance, such as slot antennas or microstrip antennas, can also be used. In addition, modulation such as quadrature phase modulation can also be used instead of the binary phase modulation.

Moreover, although the present embodiment uses the slave synchronization in which one control center functions as the master station, the present invention is not limited to such a system. For example, using a center office as the master to which a plurality of control centers are connected through communication channels enables the communication network to be expanded to a larger one by slave synchronizing the multiple control centers.

Furthermore, although the base station 12 is provided with the transceiver 18 facing the front of the traveling vehicles in this embodiment, the base station 12 can be equipped with a transceiver 18 that faces the rear of the traveling vehicles, achieving the same effect. In addition, the base station 12 can be equipped with both of these transceivers 18, which can further improve the reliability of the communications and position measurement.

According to the present invention, the mobile stations each comprise a first transceiver and a second transceiver, and the mobile stations and base stations carry out not only information communication through these transceivers, but also can obtain position information of the mobile stations consecutively. Furthermore, since providing the mobile stations with a third transceiver makes it possible to perform direct communications between the mobile stations, and to measure their relative positions consecutively, continuous information communications can be achieved using other mobile stations as a roundabout route. In this case, information on relative positions of the mobile vehicles can be continuously obtained. The information about the positions of the mobile stations enables collection of traffic information, and traffic management. In addition, since the communications can be performed between the mobile stations to exchange traveling information of the mobile stations, driving control such as platooning or autonomous driving of the vehicles can be implemented. Thus, since the system in accordance with the present invention has both the information communication function and the driving control function, it can meet various requirements as an information communication infrastructure on the roads.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A mobile communication system for providing radio communication channels for information transmission between a mobile station mounted on a vehicle traveling on a road and a fixed communication network installed on a roadside, wherein said fixed communication network includes a base station comprising a first transmitting and receiving device for carrying out radio communications with said mobile station by transmitting and receiving a data packet, wherein said mobile station comprises a second transmitting and receiving device for carrying out radio communications with said first transmitting and receiving device by transmitting and receiving a data packet, wherein each of said first and second transmitting and receiving devices comprises:

a transceiver for carrying out radio communications with its party;

two or more receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said controller measures a distance between said first and second transmitting and receiving devices in response to a transmitting time of said data packet and a received time of said radio signal from said party, and a direction with respect to said party in response to said incident angle detected by said direction finder, wherein said transceiver of each of said first and second transmitting and receiving devices comprises:

a packet assembler for assembling data packet to which a synchronizing code is added;

transmitting means for modulating an output of said packet assembler and radiating a modulated signal as radio waves;

a timer for measuring a time period from transmitting said data packet to receiving a data packet transmitted from said party;

a first synchronization detector for detecting said synchronizing code from said output of said packet assembler to start said timer;

receiving means for demodulating said data packet from an output from said receiving antenna;

a second synchronization detector for detecting said synchronizing code from an output of said receiving means to stop said timer; and a packet disassembler for extracting said data packet from the output of said receiving means, and wherein said controller calculates the distance to said party in accordance with a difference between a transmitting time of a signal carrying said data packet and a received time of a response signal from said party to said data packet measured by said timer.

2. A mobile communication system for providing radio communication channels for information transmission between a mobile station mounted on a vehicle traveling on a road and a fixed communication network installed on a roadside, wherein said fixed communication network includes a base station comprising a first transmitting and receiving device for carrying out radio communications with said mobile station by transmitting and receiving a data packet, wherein said mobile station comprises a second transmitting and receiving device for carrying out radio communications with said first transmitting and receiving device by transmitting and receiving a data packet, wherein each of said first and second transmitting and receiving devices comprises:

a transceiver for carrying out radio communications with its party;

two or more receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said controller measures a distance between said first and second transmitting and receiving devices in response to a transmitting time of said data packet and a received time of said radio signal from said party, and a direction with respect to said party in response to said incident angle detected by said direction finder, wherein said mobile station includes a third transmitting and receiving device for carrying out radio communications with another mobile station traveling behind, wherein said third transmitting and receiving device comprises:

a transceiver for carrying out radio communications with its party;

a plurality of receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said second transmitting and receiving device comprises a function to carry out communications with a third transmitting and receiving device of another mobile station traveling in front of said second transmitting and receiving device, wherein said controller of each of said third and second transmitting and receiving devices measures a distance between said third and second transmitting and receiving devices in response to a transmitting time of said data packet and a received time of said radio signal from said party, and a direction with respect to each other in response to said incident angle detected by said direction finder, wherein said transceiver of each of said first, second and third transmitting and receiving devices comprises:

a packet assembler for assembling a data packet to which a synchronizing code is added;

transmitting means for modulating an output of said packet assembler and radiating a modulated signal as radio waves;

a timer for measuring a time period from transmitting said data packet to receiving a data packet transmitted from said party;

a first synchronization detector for detecting said synchronizing code from said output of said packet assembler to start said timer;

receiving means for demodulating said data packet from an output from said receiving antenna;

a second synchronization detector for detecting said synchronizing code from an output of said receiving means to stop said timer; and a packet disassembler for extracting said data packet from the output of said receiving means, and wherein said controller calculates the distance to said party in accordance with a difference between a transmitting time of a signal carrying said data packet and a received time of a response signal from said party to said data packet measured by said timer.

3. A mobile communication system for providing radio communication channels for information transmission between a mobile station mounted on a vehicle traveling on a road and a fixed communication network installed on a roadside, wherein said fixed communication network includes a base station comprising a first transmitting and receiving device for carrying out radio communications with said mobile station by transmitting and receiving a data packet, wherein said mobile station comprises a second transmitting and receiving device for carrying out radio communications with said first transmitting and receiving device by transmitting and receiving a data packet, wherein each of said first and second transmitting and receiving devices comprises:

a transceiver for carrying out radio communications with its party;

two or more receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said controller measures a distance between said first and second transmitting and receiving devices in response to a transmitting time of said data packet and a received time of said radio signal from said party, and a direction with respect to said party in response to said incident angle detected by said direction finder, and wherein said direction finder comprises:

means for shifting a phase of an output of one of said receiving antennas;

means for adding an output of the other of said receiving antennas to an output of said shifting means;

first detecting means for carrying out square-law detection of an output of said adding means;

second detecting means for carrying out square-law detection of the output of the other of said receiving antennas; and calculating means for calculating an angle of said party relative to the station to which said direction finder belongs in response to outputs of said first and second detecting means.

4. A mobile communication system for providing radio communication channels for information transmission between a mobile station mounted on a vehicle traveling on a road and a fixed communication network installed on a roadside, wherein said fixed communication network includes a base station comprising a first transmitting and receiving device for carrying out radio communications with said mobile station by transmitting and receiving a data packet, wherein said mobile station comprises a second transmitting and receiving device for carrying out radio communications with said first transmitting and receiving device by transmitting and receiving a data packet, wherein each of said first and second transmitting and receiving devices comprises:

a transceiver for carrying out radio communications with its party;

two or more receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said controller measures a distance between said first and second transmitting and receiving devices in response to a transmitting time of said data packet and a received time of said radio signal from said party, and a direction with respect to said part in response to said incident angle detected by said direction finder, wherein said mobile station includes a third transmitting and receiving device for carrying out radio communications with another mobile station traveling behind, wherein said third transmitting and receiving device comprises:

a transceiver for carrying out radio communications with its party;

a plurality of receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said second transmitting and receiving device comprises a function to carry out communications with a third transmitting and receiving device of another mobile station traveling in front of said second transmitting and receiving device, wherein said controller of each of said third and second transmitting and receiving devices measures a distance between said third and second transmitting and receiving devices in response to a transmitting time of said data packet and a received time of said radio signal from said party, and a direction with respect to each other in response to said incident angle detected by said direction finder, and wherein said direction finder comprises:

means for shifting a phase of an output of one of said receiving antennas;

means for adding an output of the other of said receiving antennas to an output of said shifting means;

first detecting means for carrying out square-law detection of an output of said adding means;

second detecting means for carrying out square-law detection of the output of the other of said receiving antennas; and calculating means for calculating an angle of said party relative to the station to which said direction finder belongs in response to outputs of said first and second detecting means.

5. A mobile communication system for providing radio communication channels for information transmission between a mobile station mounted on a vehicle traveling on a road and a fixed communication network installed on a roadside, wherein said fixed communication network includes a base station comprising a first transmitting and receiving device for carrying out radio communications with said mobile station by transmitting and receiving a data packet, wherein said mobile station comprises a second transmitting and receiving device for carrying out radio communications with said first transmitting and receiving device by transmitting and receiving a data packet, wherein each of said first and second transmitting and receiving devices comprises:

a transceiver for carrying out radio communications with its party;

two or more receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said controller measures a distance between said first and second transmitting and receiving devices in response to a transmitting time of said data packet and a received time of said radio signal from said party, and a direction with respect to said part in response to said incident angle detected by said direction finder, and wherein said mobile station and said base station each comprise means for sharing connection information representing a connection state between said base station and said mobile station by exchanging the connection information with each other, and determine a transfer path of said data packet in response to the shared connection information such that said data packet is transferred to a desired destination through a said transfer path.

6. The mobile communication system in accordance with claim 5, wherein said mobile station includes a third transmitting and receiving device for carrying out radio communications with another mobile station traveling behind, wherein said third transmitting and receiving device comprises:

a transceiver for carrying out radio communications with its party;

a plurality of receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said second transmitting and receiving device comprises a function to carry out communications with a third transmitting and receiving device of another mobile station traveling in front of said second transmitting and receiving device, and wherein said controller of each of said third and second transmitting and receiving devices measures a distance between said third and second transmitting and receiving devices in response to a transmitting time of said data packet and a received time of said radio signal from said party, and a direction with respect to each other in response to said incident angle detected by said direction finder.

7. The mobile communication system in accordance with claim 1, wherein said transceiver of said mobile station and said transceiver of said base station each transmit or receive said data packet within slots formed by dividing a predetermined frame duration such that collision of said data packet is avoided.

8. The mobile communication system in accordance with claim 7, wherein said base station comprises a first clock generator for generating a first clock signal in slave synchronism with master clock information fed through a time division multiplexed transmission line, wherein said mobile station comprises a second clock generator for generating a second clock signal in slave synchronism with said first clock signal of said base station in response to timing information in a received signal transmitted from said base station, and wherein said mobile communication system defines said slots in response to times indicated by said first and second clock signals.

9. A communication system for providing radio communication channels for information transmission between a mobile station mounted on a vehicle traveling on a road and a fixed communication network installed on a roadside, wherein said fixed communication network includes a base station includes a first transmitting and receiving device for carrying out radio communications with said mobile station by transmitting and receiving a data packet, wherein said mobile station comprises a second transmitting and receiving device for carrying out radio communications with said first transmitting and receiving device by transmitting and receiving a data packet, wherein each of said first and second transmitting and receiving devices comprises:

a transceiver for carrying out radio communications with its party;

two or more receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said controller measures a distance between said first and second transmitting and receiving devices in response to a transmitting time of said data packet and a received time of said radio signal from said party, and a direction with respect to said party in response to said incident angle detected by said direction finder, and wherein said mobile station and said base station each determine a transfer path of said data packet in response to position information of said party, and transfer said data packet to a desired destination through said transfer path.

10. The mobile communication system in accordance with claim 9, wherein said mobile station includes a third transmitting and receiving device for carrying out radio communications with another mobile station traveling behind, wherein said third transmitting and receiving device comprises:

a transceiver for carrying out radio communications with its party;

a plurality of receiving antennas separated apart by a predetermined distance;

a direction finder for determining, in response to a radio signal caught by each of said receiving antennas, an incident angle of the radio signal on said receiving antennas; and a controller for controlling transmitting and receiving of a data packet to and from said party, wherein said second transmitting and receiving device comprises a function to carry out communications with a third transmitting and receiving device of another mobile station traveling in front of said second transmitting and receiving device, and wherein said controller of each of said third and second transmitting and receiving devices measures a distance between said third and second transmitting and receiving devices in response to a transmitting time of said data packet and a received time of said radio signal from said party, and a direction with respect to each other in response to said incident angle detected by said direction finder.

* * * * *